United States Patent
Znamenskiy et al.

(10) Patent No.: US 11,766,107 B2
(45) Date of Patent: Sep. 26, 2023

(54) COMPUTER-IMPLEMENTED METHOD FOR PROVIDING VISUAL FEEDBACK TO A USER OF A ROTARY SHAVER, AND AN APPARATUS AND COMPUTER PROGRAM PRODUCT IMPLEMENTING THE SAME

(71) Applicant: KONINKLIJKE PHILIPS N.V., Eindhoven (NL)

(72) Inventors: Dmitry Nikolayevich Znamenskiy, Eindhoven (NL); Mounir Zeitouny, Eindhoven (NL); Roman Nikitchenko, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 54 days.

(21) Appl. No.: 17/593,768

(22) PCT Filed: Mar. 25, 2020

(86) PCT No.: PCT/EP2020/058345
§ 371 (c)(1),
(2) Date: Sep. 24, 2021

(87) PCT Pub. No.: WO2020/193622
PCT Pub. Date: Oct. 1, 2020

(65) Prior Publication Data
US 2022/0183440 A1    Jun. 16, 2022

(30) Foreign Application Priority Data
Mar. 26, 2019  (EP) .................................... 19165188

(51) Int. Cl.
*A45D 27/00* (2006.01)
*G06F 3/14* (2006.01)
(Continued)

(52) U.S. Cl.
CPC ............... *A45D 27/00* (2013.01); *G06F 3/14* (2013.01); *G06T 11/203* (2013.01); *G06T 11/60* (2013.01); *G06T 2200/24* (2013.01)

(58) Field of Classification Search
None
See application file for complete search history.

(56) References Cited

U.S. PATENT DOCUMENTS

| 6,536,068 B1 | 3/2003 | Chiang |
| 2016/0262521 A1 * | 9/2016 | Kustra .................... G06T 7/38 |

(Continued)

FOREIGN PATENT DOCUMENTS

| EP | 3401065 A1 | 11/2018 |
| WO | 2017002004 A1 | 1/2017 |
| WO | 2018007547 A1 | 1/2018 |

OTHER PUBLICATIONS

International Search Report and Written Opinion, International Application No. PCT/EP2020/058345, dated Aug. 12, 2020.

*Primary Examiner* — Jeffrey J Chow

(57) ABSTRACT

According to an aspect, there is provided a computer-implemented method for providing visual feedback to a user of a rotary shaver. The method comprises (i) receiving movement measurements representing movement of the rotary shaver during a shaving operation; (ii) processing the received movement measurements to determine a representation of a trajectory of movement of the rotary shaver during the shaving operation; (iii) processing the determined representation to project the representation onto a two-dimensional plane; (iv) generating a graphical user interface, GUI, the GUI including the projected representation and a graphical template comprising an annular target zone for a correct circular motion of the rotary shaver during the shaving operation; and (v) displaying the generated GUI using a display unit.

20 Claims, 6 Drawing Sheets

(51) Int. Cl.
*G06T 11/20* (2006.01)
*G06T 11/60* (2006.01)

(56) References Cited

U.S. PATENT DOCUMENTS

| | | |
|---|---|---|
| 2018/0160796 A1 | 6/2018 | Jeanne |
| 2019/0224869 A1* | 7/2019 | Robinson .............. B26B 21/526 |
| 2021/0260780 A1* | 8/2021 | Zafiropoulos ......... B26B 19/388 |
| 2022/0398745 A1* | 12/2022 | Cui ........................... G06T 7/70 |

* cited by examiner

COMPUTER-IMPLEMENTED METHOD FOR PROVIDING VISUAL FEEDBACK TO A USER OF A ROTARY SHAVER, AND AN APPARATUS AND COMPUTER PROGRAM PRODUCT IMPLEMENTING THE SAME

CROSS-REFERENCE TO PRIOR APPLICATIONS

This application is the U.S. National Phase application under 35 U.S.C. § 371 of International Application No. PCT/EP2020/058345, filed on 25 Mar. 2020, which claims the benefit of European Patent Application No. 19165188.4, filed on 26 Mar. 2019. These applications are hereby incorporated by reference herein.

FIELD OF THE INVENTION

The invention relates to providing visual feedback to a user of a rotary shaver, and in particular to providing visual feedback regarding movement of the rotary shaver in a shaving operation.

BACKGROUND OF THE INVENTION

Shaving performance, for example in terms of the closeness of the shave and irritation caused to the skin, is largely influenced by the handling of a shaver by the user. It is known that people with a high degree of skin irritation after shaving could benefit from receiving advice or guidance about how to improve shaving motion and the pressure with which the shaver is applied to the user's skin. This is particularly the case for rotary shavers in which hairs are cut using cutting elements that comprise one or more circular blades that rotate rapidly.

US 2016/262521 describes a system and a method for guiding a user during a shaving procedure in which an image sensor registers an image of a part of the body of the user, an image analyzer determines a local hair-growth direction based on data in the image, a controller generates instructions about a direction in which a hair cutting device is to be moved in dependence on the determined local hair-growth direction, and a feedback system provides the instructions to the user. It is also described that the movement of the device can be reconstructed with an accelerometer and may indicate that the user should change the manipulation of the hair cutting device.

For an optimum shaving result when using a rotary shaver, a user should move the shaver according to circular motions with a diameter within a specific range. This type of movement can result in reduced skin irritation from a rotary shaver.

Although some systems, e.g. as described in US 2016/262521, provide guidance to the user during shaving about the direction in which the shaver is to be moved, the guidance instructions are provided in the form of a sequence of movements using visual signs on a representation of a part of the body, in an audio format and/or in a haptic format, and some users may find these types of instructions unintuitive and/or difficult to follow. This is also the case for guidance instructions in the form of text. With these types of feedback it is also difficult for the feedback to be provided in real time as the user needs time to understand and implement the instructions, which could lead to the user pausing the shaving operation while they understand the next instruction. These types of guidance instructions are also not particularly suitable for instructing the user to use an appropriate circular motion with the rotary shaver.

Therefore improvements in visual feedback provided to a user regarding the circular movement of a rotary shaver are desired in order to enable the user to further improve their shaving performance.

SUMMARY OF THE INVENTION

According to a first aspect of the invention, there is provided a computer-implemented method for providing visual feedback to a user of a rotary shaver. The method comprises (i) receiving movement measurements representing movement of the rotary shaver during a shaving operation; (ii) processing the received movement measurements to determine a representation of a trajectory of movement of the rotary shaver during the shaving operation; (iii) processing the determined representation to project the representation onto a two-dimensional plane; (iv) generating a graphical user interface, GUI, the GUI including the projected representation and a graphical template comprising an annular target zone for a correct circular motion of the rotary shaver during the shaving operation; and (v) displaying the generated GUI using a display unit. Thus, the method provides that visual feedback is provided to a user regarding the circular movement of a rotary shaver, with that feedback being highly intuitive in enabling the user to understand the correct motion of the rotary shaver to improve their shaving performance.

In some embodiments, the method further comprises repeating steps (ii)-(iv) for further received movement measurements to generate an updated GUI, and displaying the generated updated GUI using the display unit. These embodiments provide that the GUI can be updated as the user is using the rotary shaver, enabling the user to adjust the movement of the rotary shaver during the shaving operation.

In some embodiments, the method further comprises the step of comparing the projected representation to one or more boundaries represented by the annular target zone; and the step of generating the GUI further comprises generating the GUI to further include a visual element based on a result of the comparison. These embodiments provide further feedback to the user about their movement of the rotary shaver that is highly intuitive.

In some embodiments, the step of generating the GUI comprises determining an alignment of the projected representation with the graphical template; and generating the GUI with the projected representation overlaid on the graphical template according to the determined alignment. These embodiments allow the measured rotational motion of the rotary shaver to be centred or aligned with the annular target zone on the graphical template.

In some embodiments, the step of processing the received movement measurements to determine a representation of the trajectory of movement comprises filtering to remove high frequency components in the movement measurements.

In some embodiments, the step of processing the determined representation to project the representation onto a two-dimensional plane comprises for a plurality of movement measurement samples in the received movement measurements, computing an orientation of an instant tangent plane based on a previous plurality of measurement samples; projecting the movement measurement samples on to the instant tangent plane; aligning the projected movement measurement samples with previously-projected movement measurement samples; and applying de-trending to the aligned projected movement measurement samples. In these embodiments, the step of computing an orientation of an instant tangent plane can comprise using principal component analysis, PCA, to identify two principal Eigenvectors, wherein the two principal Eigenvectors define the orientation of the instant tangent plane. In these embodiments, the step of aligning can comprise using a Kabsch algorithm to determine a rotation-translation to relate the projected movement measurement sample with a previously-projected movement measurement sample; and using the determined rotation-translation matrix to align the projected movement measurement samples with the previously-projected movement measurement samples.

In some embodiments, the method further comprises the step of processing the projected representation to determine values for one or more characteristics of the movement of the rotary shaver; and the step of generating the GUI further comprises generating the GUI to further include the determined value or determined values. In these embodiments, the one or more characteristics can include a speed of movement of the rotary shaver, a velocity of movement of the rotary shaver, an elongation of movement of the rotary shaver, an amplitude of movement of the rotary shaver and/or a circularity of movement of the rotary shaver.

According to a second aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

According to a third aspect, there is provided an apparatus for providing visual feedback to a user of a rotary shaver. The apparatus comprises a display unit; and a processing unit that is configured to: receive movement measurements representing movement of the rotary shaver during a shaving operation; process the received movement measurements to determine a representation of a trajectory of movement of the rotary shaver during the shaving operation; process the determined representation to project the representation onto a two-dimensional plane; generate a graphical user interface, GUI, the GUI including the projected representation and a graphical template comprising an annular target zone for a correct circular motion of the rotary shaver during the shaving operation; and display the generated GUI using the display unit. Thus, the apparatus provides that visual feedback is provided to a user regarding the circular movement of a rotary shaver, with that feedback being highly intuitive in enabling the user to understand the correct motion of the rotary shaver to improve their shaving performance.

In some embodiments, the processing unit is further configured to repeat the processing of the received movement measurements, processing of the determined representation and generating of a GUI for further received movement measurements to generate an updated GUI, and display the generated updated GUI using the display unit. These embodiments provide that the GUI can be updated as the user is using the rotary shaver, enabling the user to adjust the movement of the rotary shaver during the shaving operation.

In some embodiments, the processing unit is further configured to compare the projected representation to one or more boundaries represented by the annular target zone; and the processing unit is configured to generate the GUI to further include a visual element based on a result of the comparison. These embodiments provide further feedback to the user about their movement of the rotary shaver that is highly intuitive.

In some embodiments, the processing unit is configured to generate the GUI by determining an alignment of the projected representation with the graphical template; and generating the GUI with the projected representation overlaid on the graphical template according to the determined alignment. These embodiments allow the measured rotational motion of the rotary shaver to be centred or aligned with the annular target zone on the graphical template.

In some embodiments, the processing unit is configured to process the received movement measurements to determine a representation of the trajectory of movement by filtering to remove high frequency components in the movement measurements.

In some embodiments, the processing unit is configured to process the determined representation to project the representation onto a two-dimensional plane by, for a plurality of movement measurement samples in the received movement measurements, computing an orientation of an instant tangent plane based on a previous plurality of measurement samples; projecting the movement measurement samples on to the instant tangent plane; aligning the projected movement measurement samples with previously-projected movement measurement samples; and applying de-trending to the aligned projected movement measurement samples. In these embodiments, the processing unit can be configured to compute an orientation of an instant tangent plane by using principal component analysis, PCA, to identify two principal Eigenvectors, wherein the two principal Eigenvectors define the orientation of the instant tangent plane. In these embodiments, the processing unit can be configured to align the projected movement measurement samples with previously-projected movement measurement samples by using a Kabsch algorithm to determine a rotation-translation to relate the projected movement measurement sample with a previously-projected movement measurement sample; and using the determined rotation-translation matrix to align the projected movement measurement samples with the previously-projected movement measurement samples.

In some embodiments, the processing unit is further configured to process the projected representation to determine values for one or more characteristics of the movement of the rotary shaver; and the processing unit is configured to generate the GUI to further include the determined value or determined values. In these embodiments, the one or more characteristics can include a speed of movement of the rotary shaver, a velocity of movement of the rotary shaver, an elongation of movement of the rotary shaver, an amplitude of movement of the rotary shaver and/or a circularity of movement of the rotary shaver.

According to a fourth aspect, there is provided a system that comprises a rotary shaver and an apparatus for providing visual feedback to a user of the rotary shaver according to the third aspect or any embodiment thereof.

In some embodiments, the apparatus is part of the rotary shaver. In alternative embodiments, the apparatus is separate from the rotary shaver.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
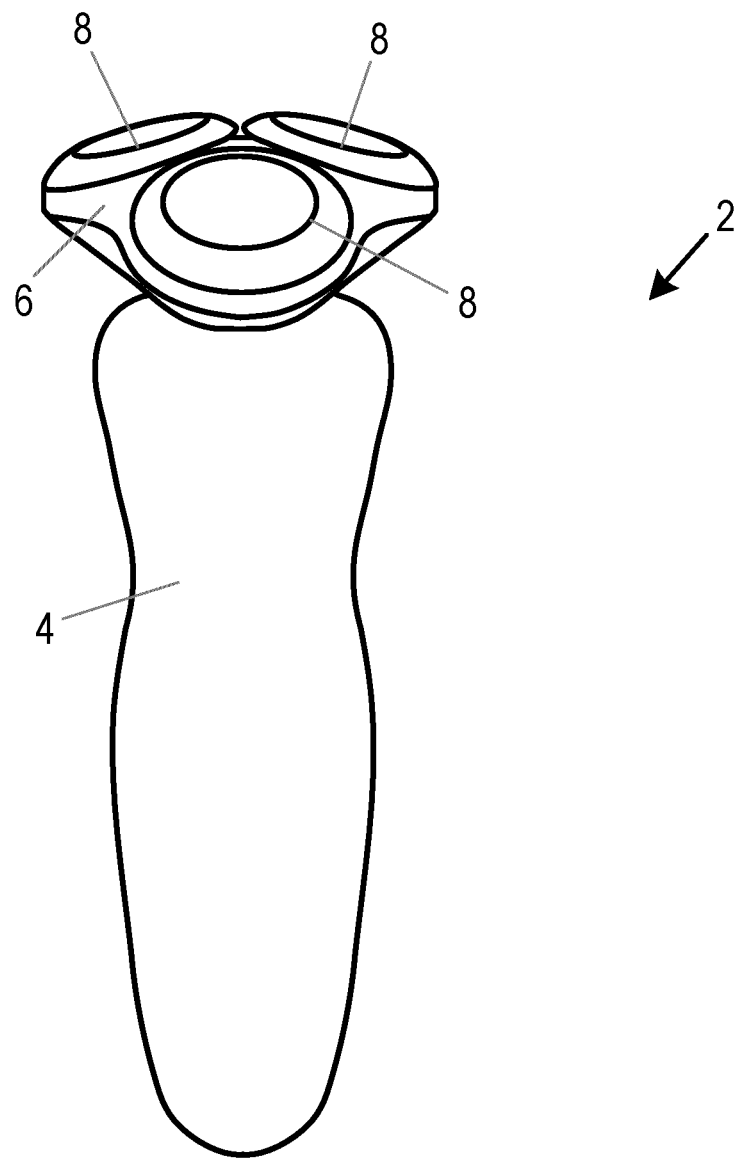
FIG. 1 is an illustration of an exemplary rotary shaver.

As noted above, the invention is for providing visual feedback to a user of a rotary shaver. FIG. 1 is an illustration of an exemplary rotary shaver. The rotary shaver 2 comprises a main body 4 that is to be held in a hand of a user and a shaving head 6 that includes a plurality of cutting elements 8. Each cutting element 8 comprises one or more circular blades (not shown in FIG. 1) that rotate rapidly. Preferably, the rotary shaver 2 is to be moved over the skin using a rotational motion, so that the shaver 2 for example follows an approximately circular path on the skin of the user. A rotary shaver 2 typically comprises at least two cutting elements 8, and preferably three cutting elements 8 arranged in a triangle (as shown in FIG. 1), although rotary shavers 2 having different numbers of cutting elements 8 and/or arrangements are available.

It has been found that moving a rotary shaver 2 with rotational motions provides an improved shaving performance, particularly in terms of reducing skin irritation.

It has also been found that rotational motions with a radius within a particular range provide the best improvement in shaving performance. The rotational (or circular) motions within the particular range are referred to as 'correct circular motions' or 'correct rotational motions' herein. Motion that is outside this particular range (i.e. having a radius larger than the particular range) is referred to herein as 'large incorrect circular motions' or 'large incorrect rotational motions', and motion that is inside this particular range (i.e. having a radius smaller than the particular range) is referred to herein as 'small incorrect circular motions' or 'small incorrect rotational motions'. Correct rotational motions can be, for example, circular motions along a circular path where the diameter of the circular path is such that the point on the user's skin corresponding to the centre point of the circular path of the rotational motion is in contact with a cutting element 8 of the rotary shaver 2, i.e. is covered by a cutting element 8 the rotary shaver 2, for at least part of the rotational motion. Following this exemplary definition, incorrect rotational motion is a circular motion along a circular path wherein the diameter of the circular path is such that there is at least one point of skin, in a central region enclosed by the circular path, that is not in contact with a cutting element 8 of the rotary shaver 2 at all during a full rotation of the rotary shaver 2 over the skin along the circular path (i.e. a part of the skin in the centre of the circular motion is missed). In the case of a rotary shaver 2 having at least two cutting elements 8 that are spaced apart, or three cutting elements 8 arranged in a triangle as shown in FIG. 1, it will be understood that this requirement for the centre point of the rotational motion to be covered by a cutting element 8 at some point during the rotational motion places both an upper bound on the diameter of the rotational motion (beyond which the rotational motion is large incorrect rotational motion) and a lower bound on the diameter of the rotational motion (below which the rotational motion is small incorrect rotational motion).

In some embodiments large incorrect rotational motion can correspond to circular motion along a circular path with a diameter that is more than three times the outer diameter of an individual cutting element 8. Similarly, in some embodiments small incorrect rotational motion can correspond to circular motion along a circular path with a diameter that is less than the larger of the inner diameter of a cutting element 8 and the diameter of a circle inscribed (also known as an 'incircle') between the cutting elements 8.

Generally, however, the term "correct rotational motion" is to be understood as a rotational motion of the rotary shaver 2 over the user's skin, wherein the rotary shaver 2 generally follows a curved closed path about a central point which is enclosed by the curved closed path, and wherein the central point on the user's skin is in contact with a cutting element 8 of the rotary shaver 2 for at least part of a full rotational motion of the rotary shaver 2 along the curved closed path. In embodiments where the path is circular or elliptical, said central point comprises the centre point of the circular or elliptical path. However, said path may also be non-circular and non-elliptical, in which case said central point is generally to be understood as comprising a geometrical centre point of the curved closed path.

Figure 2:
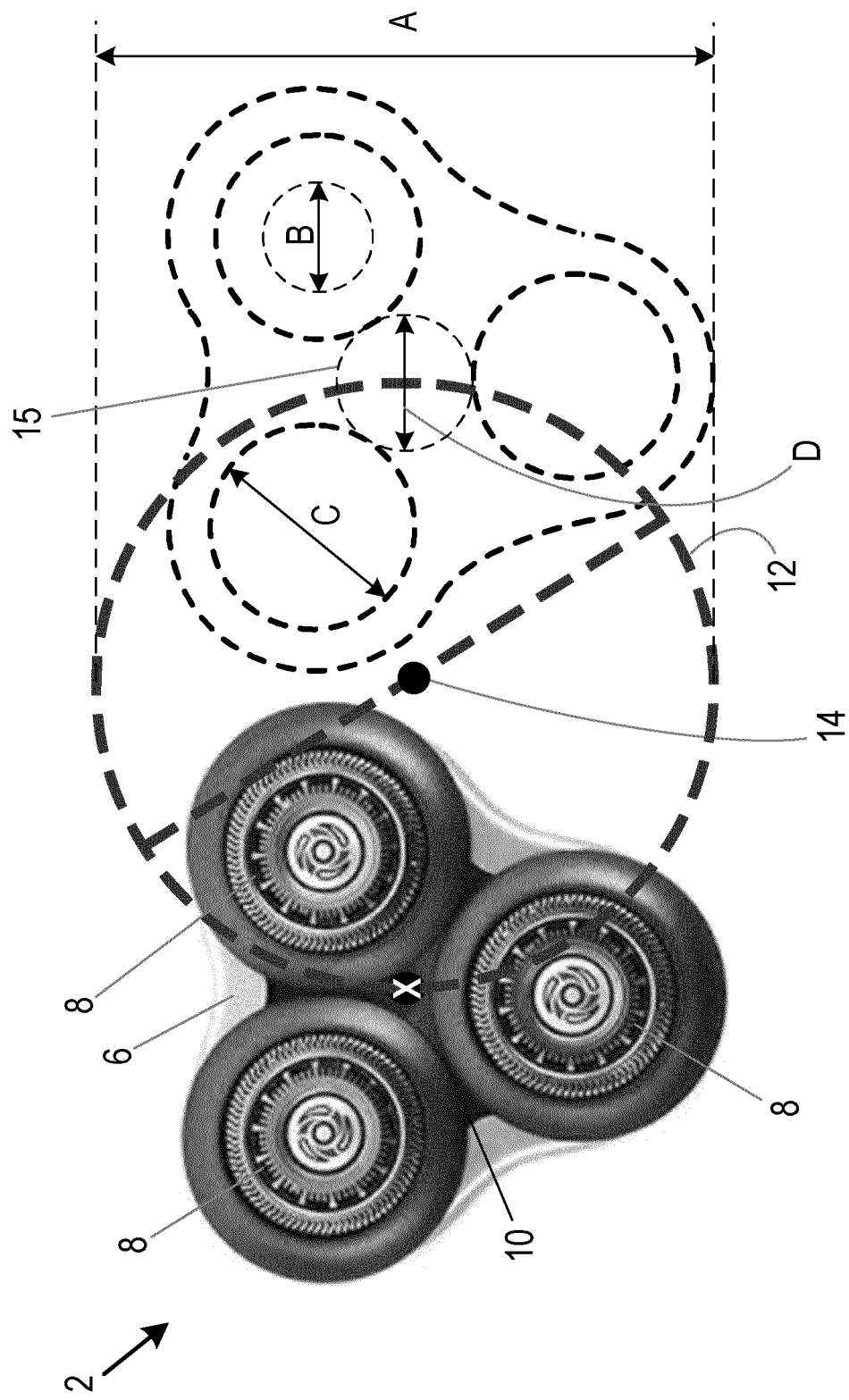
FIG. 2 illustrates an exemplary rotational motion of a shaving head.

This is illustrated in FIG. 2. FIG. 2 shows a top view of the rotary shaver 2 in FIG. 1, with the three cutting elements 8 arranged in a triangular configuration. The geometrical centre or midpoint of the shaving head 6 is marked as 10. FIG. 2 shows an example of a rotational circular motion of the shaving head 6. In particular, dashed circle 12 shows the circular path taken by the centre 10 of the shaving head 6 when the diameter of the circular path of the rotational motion is equal to A. The centre of the rotational motion is shown as point 14 and, when the rotational motion has a diameter A, the centre point 14 of the rotational motion is covered by a cutting element 8 for at least part of the full rotation (i.e. it is covered at least once during one full rotation of the shaving head 6 along the path 12). In fact, distance A is the maximum diameter of the rotational motion that ensures that the centre point 14 is covered by a cutting element 8 at some point during a full rotation of the shaving head 6 along the path 12.

FIG. 2 shows a distance B that is the inner diameter of a cutting element 8 (i.e. the diameter of closed central part inside the cutting blade(s)/cutting foil of the cutting element 8 that does not perform a cutting operation), and a distance C that is the outer diameter of a cutting element 8 (i.e. the outer edge of the cutting blade(s)/cutting foil). A typical outer diameter C of a cutting element 8 is approximately 2 centimetres (cm)-2.5 cm, although other sizes can be used. As noted above, the maximum diameter A can be three times the outer diameter of an individual cutting element 8 (i.e. A=3C). In a typical shaving head 6, based on the typical cutting element 8 sizes above, the distance A can be approximately 6 cm-7.5 cm. FIG. 2 also includes an inscribed circle 15 between the outer edges of each of the cutting elements 8. This circle 15 has a diameter D, which in this embodiment, is smaller than distance C. As noted above, diameter B or diameter D (whichever is larger) determines the minimum diameter of the rotational motion that avoids the centre point of the rotational motion being missed by a cutting element 8, with incorrect rotational motion occurring if the diameter of the rotational motion is less than either or both of diameter B or diameter D.

As set out above, correct rotational motion generally is the rotational motion about a central region such that each point on the user's skin located in said central region is covered (i.e. in contact with a cutting element 8 of the shaving head 6) for at least part of the rotational motion, and this requires the diameter of the rotational motion to be larger than a lower bound (e.g. larger than both of: (i) an inner diameter B of a cutting element 8 and (ii) the diameter D of an inscribed circle 15 between the outer edges of the cutting elements 8) and smaller than an upper bound (e.g. the diameter A, which can be three times the outer diameter C of a cutting element 8).

Figure 3:
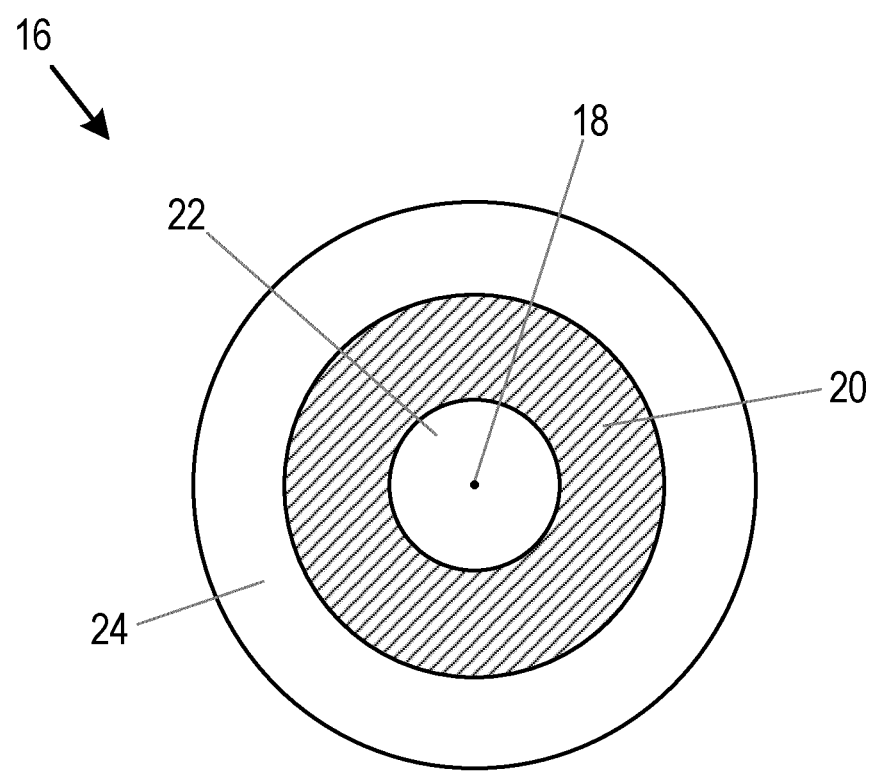
FIG. 3 is an illustration of an exemplary annular target zone for correct circular motion.

Based on the definition of correct rotational motion above, the correct motion of the rotary shaver 2 can be represented graphically by a template. An exemplary graphical template 16 is shown in FIG. 3. The graphical template 16 has a centre point 18, an annular (i.e. ring-shaped) target zone 20 representing the area or zone in which correct movement of the rotary shaver 2 occurs, an inner incorrect zone 22 and an outer incorrect zone 24. The annular target zone 20, inner incorrect zone 22 and outer incorrect zone 24 are all centred on centre point 18. Although the outer incorrect zone 24 is shown as a ring (annulus) around the target zone 20, it will be appreciated that the outer incorrect zone 24 may not have an outer boundary and can just be defined as any movement greater than the radius of movement permitted by the target zone 20.

The invention makes use of this graphical template 16 to provide visual feedback to the user of the rotary shaver 2. In particular, the movements of the rotary shaver 2 are measured and a representation of the trajectory of movement of the rotary shaver 2 is projected on to the graphical template 16, so that the user can easily see whether their movements of the rotary shaver 2 are correct, and if not, how to adjust the motion of the rotary shaver 2 to achieve correct rotational motion. The use of this graphical template 16 enables the motion to be assessed by the user quickly and efficiently, and for the degree of occurrence of correct rotational motion performed by the user to increase.

Figure 4:
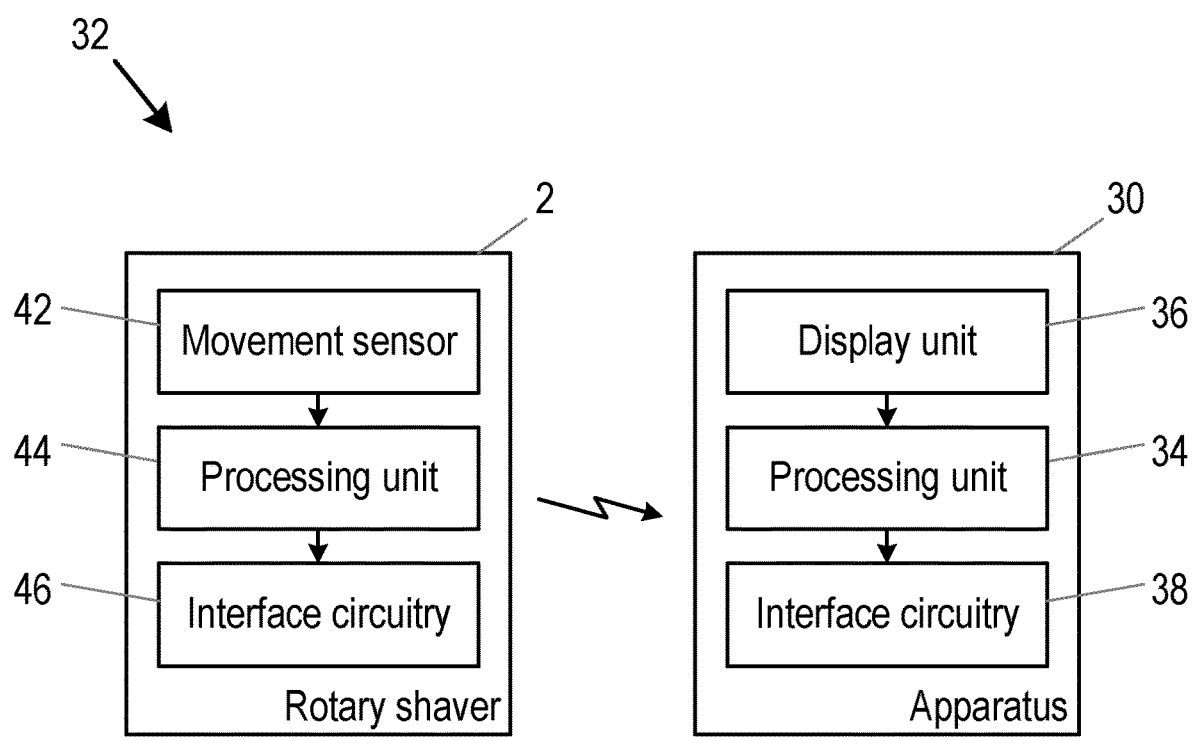
FIG. 4 is a block diagram of an exemplary system comprising a rotary shaver and an apparatus for providing visual feedback to a user of the rotary shaver according to the invention.

FIG. 4 shows a block diagram of an exemplary apparatus 30 for providing visual feedback to a user of a rotary shaver 2 according to the invention. The apparatus 30 is shown as part of a system 32 that also includes the rotary shaver 2. In the embodiments shown in FIG. 4, the apparatus 30 is a separate device/apparatus to the rotary shaver 2, and thus the apparatus 30 may be in the form of an electronic device, such as a smart phone, smart watch, tablet, personal digital assistant (PDA), laptop, desktop computer, smart mirror, etc. In other embodiments (not shown in FIG. 4), the apparatus 30, and particularly the functionality according to the invention provided by the apparatus 30, is part of the rotary shaver 2.

The apparatus 30 comprises a processing unit 34 and a display unit 36. The processing unit 34 generally controls the operation of the apparatus 30 and enables the apparatus 30 to perform the method and techniques described herein. Briefly, the processing unit 34 receives measurements of the movements of the rotary shaver 2 and processes them to generate a graphical user interface (GUI) that includes a representation of the movements overlaid or superimposed on the graphical template 16 of the target zone.

Thus the processing unit 34 can be configured to receive the movement measurements from another component of the apparatus 30 and therefore the processing unit 34 can include or comprise one or more input ports or other components for receiving the movement measurements from the other component.

The processing unit 34 can cause the generated GUI to be displayed on the display unit 36, and therefore the processing unit 34 can comprise one or more output ports or other components for signalling the generated GUI to the display unit 36.

The processing unit 34 can be implemented in numerous ways, with software and/or hardware, to perform the various functions described herein. The processing unit 34 may comprise one or more microprocessors or digital signal processors (DSPs) that may be programmed using software or computer program code to perform the required functions and/or to control components of the processing unit 34 to effect the required functions. The processing unit 34 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 34 can comprise or be associated with a memory unit (not shown in FIG. 4). The memory unit can store data, information and/or signals (including movement measurements) for use by the processing unit 34 in controlling the operation of the apparatus 30 and/or in executing or performing the methods described herein. In some implementations the memory unit stores computer-readable code that can be executed by the processing unit 34 so that the processing unit 34 performs one or more functions, including the methods described herein. In particular embodiments, the program code can be in the form of an application for a smart phone, tablet, laptop or computer. The memory unit can comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM) and electrically erasable PROM (EEPROM), and the memory unit can be implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

In the embodiment shown in FIG. 4, as the apparatus 30 is separate from the rotary shaver 2, the apparatus 30 also includes interface circuitry 38 to enable the apparatus 30 to receive the movement measurements from the rotary shaver 2. The interface circuitry 38 in the apparatus 30 enables a data connection to and/or data exchange with other devices, including any one or more of rotary shaver 2, servers, databases, user devices, and sensors. The connection to the rotary shaver 2 (or any other device) may be direct or indirect (e.g. via the Internet), and thus the interface circuitry 38 can enable a connection between the apparatus 30 and a network, or directly between the apparatus 30 and another device (such as rotary shaver 2), via any desirable wired or wireless communication protocol. For example, the interface circuitry 38 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 38 (and thus apparatus 30) may include one or more suitable antennas for transmitting/receiving over a transmission medium (e.g. the air). Alternatively, in the case of a wireless connection, the interface circuitry 38 may include means (e.g. a connector or plug) to enable the interface circuitry 38 to be connected to one or more suitable antennas external to the apparatus 30 for transmitting/receiving over a transmission medium (e.g. the air). The interface circuitry 38 is connected to the processing unit 34.

The display unit 36 can be any type of display unit that is capable of displaying a GUI, or causing the display of a GUI, that includes the representation of the rotary shaver movements overlaid or superimposed on the graphical template 16 of the target zone. The display unit 36 may display or cause the display of the GUI in colour, black and white, or monochrome. The display unit 36 can be or include a display screen that uses any suitable display technology, including, but not limited to, liquid crystal display (LCD), light emitting diodes (LEDs), organic LEDs (OLEDs), plasma, cathode ray tube (CRT), etc. In some embodiments, the display screen may include touch functionality. In some embodiments, the display unit 36 may be part of a larger device, such as smart mirror. In some embodiments, the display unit 36 can be in the form of a projector for projecting the GUI on to another object, such as a wall, ceiling, mirror, etc.

Although not shown in FIG. 4, the apparatus 30 may comprise one or more user interface components that includes one or more components that enables a user of apparatus 30 to input information, data and/or commands into the apparatus 30, and/or enables the apparatus 30 to output information or data to the user of the apparatus 30. The user interface can comprise any suitable input component(s), including but not limited to a keyboard, keypad, one or more buttons, switches or dials, a mouse, a track pad, a touchscreen, a stylus, a camera, a microphone, etc., and the user interface can comprise any suitable output component(s), including but not limited to the display unit 36, one or more lights or light elements, one or more loudspeakers, a vibrating element, etc.

It will be appreciated that a practical implementation of an apparatus 30 may include additional components to those shown in FIG. 4. For example the apparatus 30 may also include a power supply, such as a battery, or components for enabling the apparatus 30 to be connected to a mains power supply.

The rotary shaver 2 shown in FIG. 4 includes a movement sensor 42 for measuring the movements of the rotary shaver 2, a shaver processing unit 44 and interface circuitry 46. The interface circuitry 46 is for transmitting signals from the rotary shaver 2 to the apparatus 30. The interface circuitry 46 can be implemented according to any of the options outlined above for the interface circuitry 38 in the apparatus 30 in order to communicate with the interface circuitry 38 in the apparatus 30.

The movement sensor 42 is for measuring the movement or motion of the rotary shaver 2 during use of the shaver 2 by the user. The movement sensor 42 can output movement measurements in the form of a continuous signal (or signals) or a time series of measurement samples according to a sampling rate of the movement sensor 42. The movement sensor 42 is preferably integral with or otherwise fixed to the shaver 2 so that the movement sensor 42 directly measures the movements of the rotary shaver 2. In some embodiments, the movement sensor 42 is an accelerometer, for example that measures acceleration along three orthogonal axes (i.e. in three dimensions). Alternatively or in addition, the movement sensor 42 can comprise a gyroscope or a magnetometer. In alternative embodiments to that shown in FIG. 4, the movement of the rotary shaver 2 can be measured by a movement sensor in the form of a camera or other image capture device that is separate from the shaver 2 and that observes and records the motion of the shaver 2. The images can be analysed to extract the movement of the shaver 2 over time. A camera or image capture device has an advantage that the motion of the rotary shaver 2 is captured in a two-dimensional plane, potentially avoiding the need to subsequently project motion captured in three dimensions onto a two-dimensional plane.

The shaver processing unit 44 generally controls the operation of the rotary shaver 2, for example activating and deactivating one or more cutting elements 8 to effect a shaving or other hair cutting operation. The shaver processing unit 44 can be implemented in numerous ways according to any of the options outlined above for the processing unit 34 in the apparatus 30.

The shaver processing unit 44 is connected to the movement sensor 42 and receives measurements of the movement of the rotary shaver 2 from the movement sensor 42, for example via an input port to the shaver processing unit 44. In some embodiments, the shaver processing unit 44 may output the measurements (e.g. raw acceleration data) of the movement to the interface circuitry 46 for transmission to the apparatus 30 for subsequent processing. In alternative embodiments, the shaver processing unit 44 perform some initial processing on the measurements, for example to reduce noise or other artefacts, and the shaver processing unit 44 outputs the processed movements measurements to the interface circuitry 46 for transmission to the apparatus 30 for subsequent processing.

In a preferred implementation of FIG. 4, the apparatus 2 is a smart phone or smart mirror that is executing an application that provides the functionality according to the invention, and the shaver 8 and smart phone 2 communicate using Bluetooth.

In embodiments where the apparatus 30, or the functionality of the apparatus 30, is part of the rotary shaver 2, the shaver processing unit 44 can implement the functions of the apparatus processing unit 34 to generate the GUI according to the invention.

Figure 5:
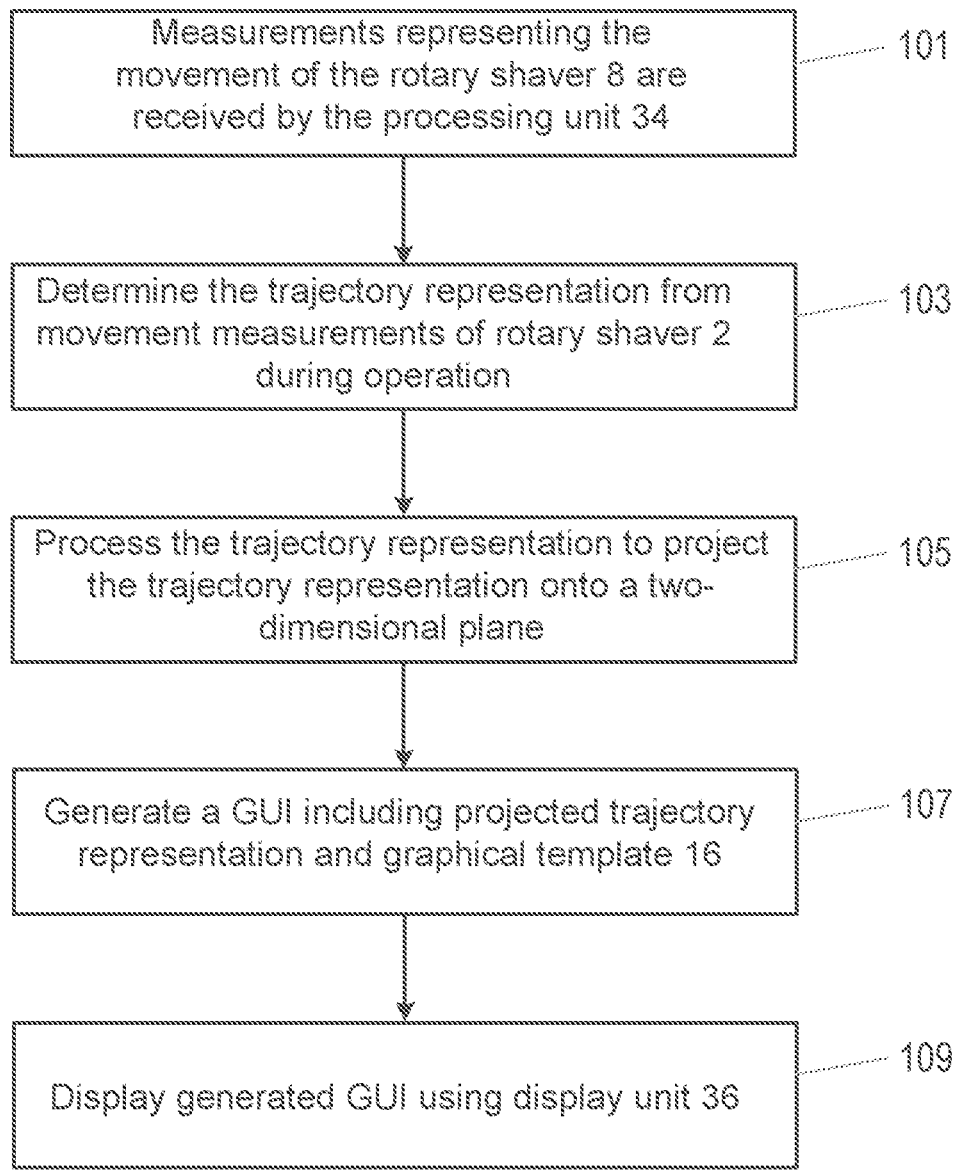
FIG. 5 is a flow chart illustrating an exemplary method for providing visual feedback to a user of a rotary shaver according to the invention.

The flow chart in FIG. 5 illustrates an exemplary method performed by the apparatus 30 according to the techniques described herein. One or more of the steps of the method can be performed by the processing unit 34 in the apparatus 30, in conjunction with any of the interface circuitry 38 (if present) and display unit 36 as appropriate. The processing unit 34 may perform the one or more steps in response to executing computer program code, that can be stored on a computer readable medium, such as, for example, a memory unit.

During a shaving operation (e.g. when the cutting elements 8 are activated/operational and the rotary shaver 2 is being moved by a user), the movement sensor 42 measures the movements of the rotary shaver 2.

In a first step of the method, step 101, the measurements representing the movement of the rotary shaver 8 are received by the processing unit 34. The movement measurements can be received by the processing unit 34 directly from the movement sensor 42 (for example where the processing unit 34 is part of the rotary shaver 2), or they can be received by the processing unit 34 via the interface circuitry 38. In order to provide the visual feedback to the user in real-time or near real-time, measurements of movements are obtained by the movement sensor 42 continuously or semi-continuously (e.g. according to a sampling rate of the movement sensor 42) and provided to the processing unit 34 continuously or semi-continuously (i.e. as the measurements are obtained by the movement sensor 42). The movement measurements may represent the movements of the rotary shaver 2 in three dimensions (3D). In preferred embodiments the movement sensor 42 is an accelerometer and the movement measurements are measurements of acceleration. The measurements of acceleration may be measurements of the acceleration in three-dimensions.

Optionally, the received measurements can be filtered to remove high frequency noise. For example, the measurements can be low-pass filtered to remove high frequency components of the measurement signal.

In step 103, the received movement measurements are processed to determine a representation of the trajectory of movement of the rotary shaver 2 during the shaving operation. The representation of the trajectory is referred to herein as 'trajectory representation'. The trajectory representation indicates the path that the rotary shaver 2 has taken. In embodiments that are described in more detail below, the trajectory representation is an approximation of the actual trajectory of the rotary shaver 2, although this approximation is sufficient for the purposes of this invention.

Step 103 can determine the representation of the trajectory from all movement measurements received during the shaving operation, in which case the trajectory representation will indicate the path taken during the shaving operation so far. Alternatively, step 103 can determine the trajectory representation from the most recent movement measurements received during the shaving operation. For example, the trajectory representation can be determined from the movement measurements received for a preceding time period, for example the last 10 seconds, the last 20 seconds, etc. In that case, the trajectory representation will indicate the path taken during the last 10 seconds, 20 seconds, etc. This alternative approach has the advantage that if the user corrects their movement of the rotary shaver 2, the 'incorrect' movements shown in the visual feedback will no longer be shown in the visual feedback after the time period. Embodiments of step 103 are described in more detail below.

Next, in step 105, the trajectory representation is processed to project the trajectory representation onto a two-dimensional plane. This step enables the trajectory representation to be presented by the display unit 36, which outputs a two-dimensional image. Embodiments of step 105 are described in more detail below. In preferred embodiments where the movement measurements are acceleration measurements representing acceleration in three dimensions, step 105 effectively maps or 'flattens' the trajectory representation into two dimensions.

Then, in step 107, a GUI is generated that includes the projected trajectory representation and the graphical template 16 that includes the annular target zone 20 for correct circular motion of the rotary shaver 2 during the shaving operation. Thus, in step 107 the projected trajectory representation (which is in the form of a line in the two-dimensional plane) is overlaid or superimposed on the graphical template 16 of the annular target zone 20 to generate the GUI.

Finally, in step 109, the generated GUI is displayed using display unit 36. In this way, the user is able to see whether the path (trajectory representation) taken by the rotary shaver 2 during the shaving operation (or during the last few seconds of the shaving operation) is within the correct rotational movement boundary indicated by the annular target zone 20.

In step 109 the processing unit 34 can provide a suitable signal or data to the display unit 36 to enable the display unit 36 to display the GUI. This enables the user to view the visual feedback and adjust their movement of the rotary shaver 2 accordingly.

So that the generated GUI can show feedback in real-time or near-real time (i.e. so that the GUI can be updated to include the most recent movements of the rotary shaver 2), steps 101-109 are repeated continuously or semi-continuously (e.g. several times per second) to update the GUI using further received movement measurements.

In some embodiments, the method can further comprise comparing the projected trajectory representation to the inner and/or outer boundaries of the annular target zone 20, and based on the comparison a further visual element can be included in the GUI generated in step 107. Step 109 will then include displaying the GUI including the further visual element.

In some embodiments, the further visual element can be a symbol, such as an Emoji, with the particular symbol/Emoji used in the GUI being dependent on the result of the comparison. For example, if the comparison indicates that the projected trajectory representation is completely within the annular target zone 20, or a sufficient amount of the projected trajectory representation (e.g. a most recent portion) is within the annular target zone 20, the symbol/Emoji can be a 'positive' symbol such as a 'tick' or a 'smiling face'. If the comparison indicates that the projected trajectory representation is completely outside the annular target zone 20, or a sufficient amount of the projected trajectory representation (e.g. a most recent portion) is outside the annular target zone 20, the symbol/Emoji can be a 'negative' symbol such as a 'X' or a 'sad face'.

The comparison can be performed in a number of different ways. For example, the comparison can comprise determining if any part of the projected trajectory representation, or a most recent part of the projected trajectory representation, is outside the annular target zone 20 (i.e. in the inner incorrect zone 22 or outer incorrect zone 24). As another example, the comparison can comprise determining the proportion of the projected trajectory representation, or a most recent part of the projected trajectory representation, that is outside the annular target zone 20. As another example (which can be in addition to the previous examples), the comparison can comprise determining a number of times that the projected trajectory representation crosses from the annular target zone to the inner incorrect zone 22 or to the outer incorrect zone 24.

Figure 7:
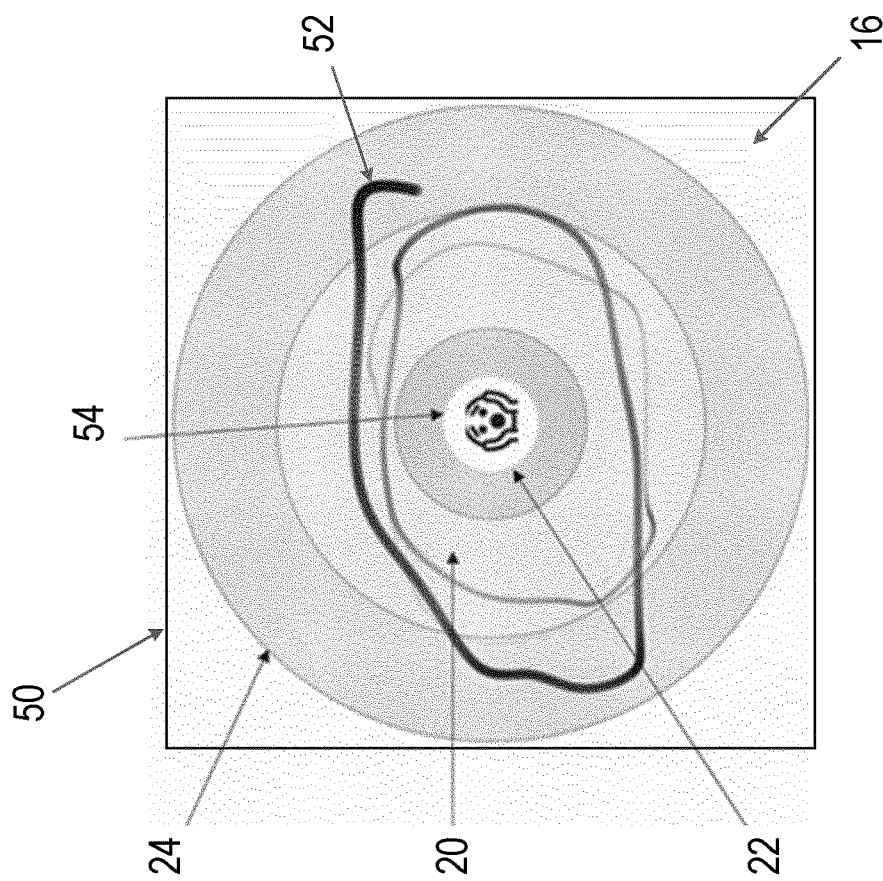
FIG. 7 illustrates another exemplary graphical user interface (GUI) generated according to the invention.
Figure 6:
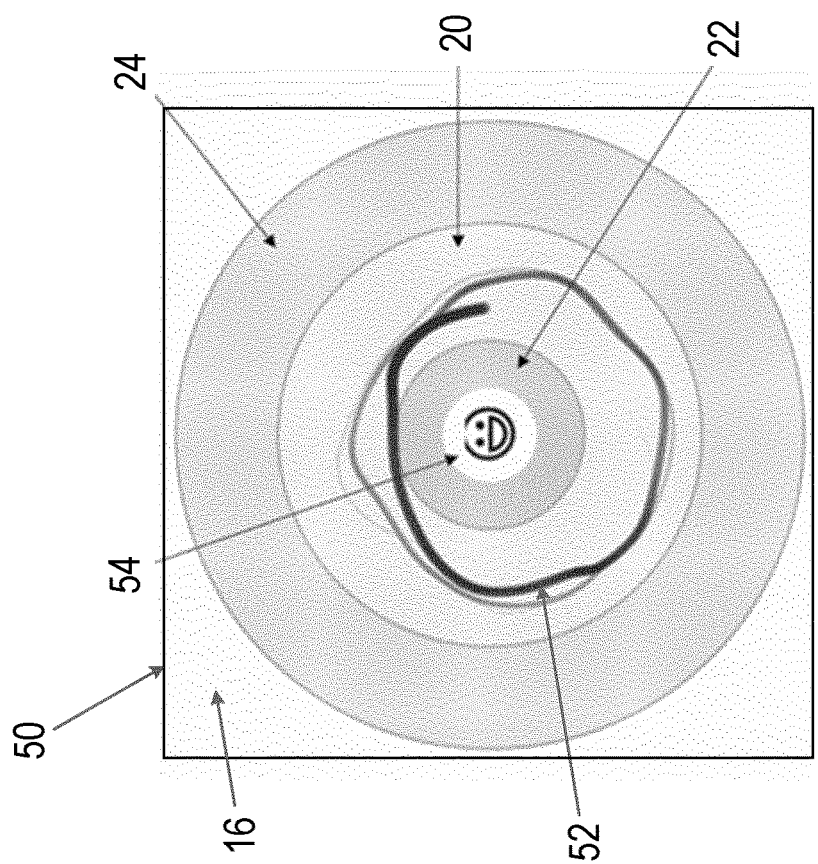
FIG. 6 illustrates an exemplary graphical user interface (GUI) generated according to the invention.

FIGS. 6 and 7 illustrate respective exemplary GUIs 50 that can be generated and displayed according to the invention for two different shaving operations by a user (or by different users). Each GUI 50 includes the graphical template 16 of the annular target zone 20 with the inner incorrect zone 22 and outer incorrect zone 24, and the projected trajectory representation 52 overlaid on the graphical template 16. Each GUI 50 also includes a symbol 54 (e.g. an Emoji) that has been determined based on a comparison of the relevant projected trajectory representation to the target zone 20. As noted above, the inclusion of symbol 54 in the GUI 50 is optional, and the position of the symbol 54 in the GUI 50 is optional. For example, rather than include the symbol 54 in the middle of the graphical template 16, the symbol 54 can be included at the top of the GUI 50, or elsewhere in the GUI 50.

It can be seen in FIG. 6 that the projected trajectory representation 52 is completely within the annular target zone 20, and follows a generally circular path in the target zone 20. Thus, the user is moving the rotary shaver 2 correctly. The symbol 52 in the middle of the GUI 50 is therefore a 'smiling' Emoji. However, it can be seen in FIG.

7 that the projected trajectory representation 52 is more elliptical with the projected trajectory representation 52 crossing out of the target zone 20 and covering parts of the outer incorrect zone 24. Thus, the user is not moving the rotary shaver 2 in a correct circular motion. The symbol 52 in the middle of the GUI 50 is therefore a 'sad' Emoji.

It can also be seen in FIGS. 6 and 7 that the projected trajectory representation 52 is displayed with older (less recent) parts of the path faded relative to more recent parts to enable the user to see the current position and path of the rotary shaver 2 more easily.

It will be appreciated from FIGS. 6 and 7 that the generation of the GUI 50 in step 107 includes a step of determining an alignment between the projected trajectory representation 52 and the graphical template 16, and then overlaying or superimposing the projected trajectory representation 52 on the graphical template 16 according to the determined alignment. Generally, the projected trajectory representation 52 is analysed to determine a central point of the projected trajectory representation 52, and this is aligned with the centre point 18 of the graphical template 16 in the GUI 50. This alignment of the projected trajectory representation 52 and the graphical template 16 can be obtained by de-trending the projected trajectory representation 52. De-trending of the projected trajectory representation 52 can be done by fitting a constant speed displacement model in the last part of the projected trajectory representation 52 and then subtracting this model to obtain a de-trended projected trajectory representation 52. Put another way, de-trending is performed by finding and compensating the constant direction and velocity displacement that minimises the variance of the projected movement measurement samples.

An exemplary embodiment for determining the trajectory representation from acceleration measurements is provided below. It will be appreciated that it is difficult to reconstruct the actual trajectory of movement of the rotary shaver 2 from acceleration measurements (for example by double-integrating the accelerations), so in step 103 a representation (i.e. estimate) of the movement trajectory is determined.

It can be assumed that (pseudo-)periodic and (pseudo-) circular motions can be mathematically described in terms of sin and cos functions as follows:

$$X(t)=\sin(\omega \cdot t+\varphi_x), Y(t)=\cos(\omega \cdot t+\varphi_y), Z(t)=\cos(\omega \cdot t+\varphi_z) \quad (1)$$

where $\omega>0$ is (instant) angular velocity and $\varphi_x, \varphi_y, \varphi_z$ are (instant) phases (the instant angular velocity and instant phase are used as they are both slowly varying functions of time), for which the second derivative (i.e. acceleration) is proportional to the inversed signal of (X, Y, Z):

$$\frac{d^2}{(dt)^2}X(t) = \frac{d^2}{(dt)^2}\sin(\omega \cdot t + \varphi_x) \quad (2)$$
$$= -\omega^2 \cdot \sin(\omega \cdot t + \varphi_x)$$
$$= -\omega^2 \cdot X(t),$$
$$\frac{d^2}{(dt)^2}Y(t) = \frac{d^2}{(dt)^2}\cos(\omega \cdot t + \varphi_y)$$
$$= -\omega^2 \cdot \cos(\omega \cdot t + \varphi_y)$$
$$= -\omega^2 \cdot Y(t),$$
$$\frac{d^2}{(dt)^2}Z(t) = \frac{d^2}{(dt)^2}\cos(\omega \cdot t + \varphi_z)$$
$$= -\omega^2 \cdot \cos(\omega \cdot t + \varphi_z)$$
$$= -\omega^2 \cdot Y(t)$$

which suggests that the double integration can be replaced by inversion and scaling of the accelerometer signal, where the noise can be addressed with the low-pass filtering.

In some embodiments, processing the trajectory representation onto the two-dimensional plane in step 105 comprises projecting the movement measurements on an instant tangent plane of the movement. In particular, for a plurality of movement measurement samples in the movement measurements received in step 101, an orientation of an instant tangent plane is computed based on a previous plurality of measurement samples (this is effectively a temporal stabilisation of the instant plane). The current movement measurement samples (e.g. the samples collected in the last 1 second) are then projected onto the instant tangent plane. This projection can comprise identifying the closest points on the plane to each measurement sample, and then defining the coordinate axes on that plane. The coordinates of all projected points with respect to defined axes can then be determined. The projected movement measurement samples are then aligned with previously-projected movement measurement samples, and de-trending is applied to the aligned projected movement measurement samples.

In some embodiments, principal component analysis (PCA) can be used to identify two principal Eigenvectors, with the two principal Eigenvectors defining the orientation of the instant tangent plane. Thus, for every incoming sample $(X(t_0), Y(t_0), Z(t_0))$, the orientation of the instant tangent plane is calculated based on the last N samples of the accelerometer (e.g. N could be 60 for an accelerometer with a sampling rate of 50 Hz). The orientation of the instant tangent plane is defined by the first two principal eigenvectors $(\vec{V}_1, \vec{V}_2)$ in the PCA decomposition of the (optionally low-pass filtered) accelerometer signal:

$$(X(t),Y(t)Z(t))=(X_0,Y_0,Z_0)+\vec{V}_1 \cdot C_1(t)+\vec{V}_2 \cdot C_2(t)+ \vec{V}_3 \cdot C_3(t), t=t_{-N+1}, \ldots, t_0, \quad (3)$$

where $t_{-N+1}, \ldots, t_0$ are the last N samples, and $C_1(t), C_2(t), C_3(t)$ are PCA coefficients.

Those skilled in the art will be aware of various alternatives to using PCA to define the orientation of the instant tangent plane (which is the plane after projection on which the root mean squared (RMS) of residual error is minimised).

Continuing the PCA-based example, to project the current movement measurement sample onto the instant tangent plane to obtain a two-dimensional signal (the projected representation), consider $(C_1)|_1^N$, $(C_2)|_1^N$ in the above PCA decomposition. In the PCA decompositions the eigenvectors and coefficients can eventually switch that polarity, since:

$$\vec{V}_1 \cdot C_1(t)=(-\vec{V}_1) \cdot (-C_1), \vec{V}_2 \cdot C_2(t)= (-\vec{V}_2) \cdot (-C_2), t=t_{-N+1}, \ldots, t_0 \quad (4)$$

Therefore, in order to have a temporally consistent two-dimensional signal the direction of the principal eigenvectors and PCA coefficients are inverted. Thus if $(\vec{V}_1^P, \vec{V}_2^P)$ correspond to the PCA decomposition of signal (X(t), Y(t) Z(t)), $t=t_{-N}, \ldots, t_1$ computed at previous time $t_1$, then $(\vec{V}_1, \vec{V}_2)$ are updated to keep pairs $(\vec{V}_1^P, \vec{V}_1)$ and $(\vec{V}_2^P, \vec{V}_2)$ collinear:

$\vec{V}_1 \rightarrow -\vec{V}_1$, if the inner product of $\vec{V}_1^P$ and $\vec{V}_1$ is negative $\vec{V}_2 \rightarrow -\vec{V}_2$, if the inner product of $\vec{V}_2^P$ and $\vec{V}_2$ is negative Those skilled in the art will be aware of other techniques for projecting the measurements on to the tangent plane.

To align the projected movement measurement sample with a previously-projected movement measurement sample, a Kabsch algorithm (for example as described in "A solution for the best rotation to relate two sets of vectors" by W. Kabsch, Acta Cryst A 1976; 32; 9223 and "A discussion of the solution for the best rotation to relate two vectors" by W. Kabsch, Acta Cryst A 1978; 34; 8278) can be used to determine a rotation to relate the projected movement measurement sample to a previously-projected movement measurement sample. The Kabsch algorithm provides a two-dimensional rotation-translation matrix which is applied to $(C_1(t), C_2(t))$, $t=t_{-N+1}, \ldots, t_0$.

Thus, $(C_1(t), C_2(t))$, $t=t_{-N+1}, \ldots, t_0$, is aligned to $(C_1^P(t), C_2^P(t))$, $t=t_{-N}, \ldots, t_1$, corresponding to the PCA decomposition of signal $(X(t), Y(t) Z(t))$, $t=t_{-N}, \ldots, t_1$ computed at previous time $t_1$.

After aligning the projected measurement sample, the projected representation can eventually drift away from the origin, i.e. (0, 0) value. De-trending (preferably linear de-trending) is used to improve the visualisation (display) of the projected representation (i.e. by aligning the projected representation and the graphical template. The de-trending is performed by assuming linear motion with constant speed in the last N samples, and subtracting this motion. Linear de-trending can be applied according to:

$$C_1(t)=C_1(t)-a_1-b_1 \cdot t, C_2(t) \rightarrow C_2(t)-a_2-b_2 \cdot t, t=t_{-N+1}, \ldots, t_0, \quad (5)$$

where $a_1, b_1, a_2, b_2$ are constants found to minimize the sums of squares:

$$\sum_{t=t_{-N+1},\ldots,t_0} (C_1(t) - a_1 - b_1 \cdot t)^2 \text{ and} \quad (6)$$

$$\sum_{t=t_{-N+1},\ldots,t_0} (C_2(t) - a_2 - b_2 \cdot t)^2,$$

In some embodiments, the projected trajectory representation may need to be scaled before display with the graphical template, and/or depending on the position of the accelerometer in the rotary shaver 2, the projected trajectory representation may need to be inverted (i.e. the sign changed).

In some embodiments, the method in FIG. 5 can further include determining values for one or more characteristics of the movement of the rotary shaver 2 from the projected trajectory representation. The characteristics can include the speed of movement of the rotary shaver 2, a velocity of movement, an elongation of movement (e.g. a ratio between the variances of the second coefficient and the first coefficient in the PCA decomposition), an amplitude of movement (effectively the average (e.g. mean) radius of the circular motion), a circularity of movement (which can be given by an absolute sum of rotation angles between $(C_1(t), C_2(t))$, $t=t_{-N+1}, \ldots, t_0$, and $(C_1^P(t), C_2^P(t))$, $t=t_{-N}, \ldots, t_1$, for a predetermined number of previous measurement samples (e.g. the last 60 samples) and/or a type of motion (e.g. circular vs. linear strokes), and the squared angular velocity. The value(s) of the characteristic(s) can be included in the GUI generated in step 107 and displayed to the user. For example, FIG. 6 could display the speed as 115 millimetres/second (mm/s), and FIG. 7 could display the speed as 144 mm/s. In some embodiments, the determined value(s) of the characteristic(s) can be evaluated to determine if they are correct or appropriate for a shaving operation. For example, the speed of movement of the rotary shaver 2 can be compared to a threshold speed or range of acceptable movement speeds to determine if the movement speed is correct. Alternatively, the value(s) of the characteristic(s) can be classified into correct/incorrect, for example, using standard machine learning techniques (like SVM, Decision Trees, Non-linear regression, etc.) that have been trained on measurements/projected trajectory representations for a number of other shaving operations by the user and/or a population of other users. The result of the comparison between the determined value(s) and the acceptable range or threshold or the result of the classification can also be included in the GUI.

Velocity of movement can be determined from the projected trajectory representation using:

$$V = \frac{1}{t_0 - t_{N-1}} \sum_{i=N-2}^{0} \sqrt{(C_1(t_i) - C_1(t_{i-1}))^2 + (C_2(t_i) - C_2(t_{i-1}))^2}, \quad (7)$$

Elongation of movement can be determined from the projected trajectory representation using:

$$E = \frac{\sum_{i=N-1}^{0} \sqrt{(C_1(t_i))^2}}{\sum_{i=N-1}^{0} \sqrt{(C_2(t_i))^2}} \quad (8)$$

Amplitude of movement can be determined from the projected trajectory representation using:

$$A = \frac{1}{N} \sum_{i=N-1}^{0} \sqrt{(C_1(t_i))^2 + (C_2(t_i))^2} \quad (9)$$

Circularity of movement can be determined from the projected trajectory representation using:

$$C = \frac{1}{N-1} \sum_{i=N-1}^{0} \left( \sqrt{(C_1(t_i))^2 + (C_2(t_i))^2} - A \right)^2 \quad (10)$$

The angular velocity (measured in radians per second), which relates the acceleration with position and which can be used for the normalisation of the trajectory representation and other features, can be estimated through the sum of rotation angles using:

$$\omega = \frac{1}{(t_0 - t_{N-1})} \sum_{i=N-2}^{0} \omega_i \text{ where}$$

$$\omega_i \approx \sin \omega_i = \frac{C_1(t_i) C_2(t_{i-1}) - C_2(t_i) C_1(t_{i-1})}{\sqrt{(C_1(t_i))^2 + (C_2(t_i))^2} \sqrt{(C_1(t_{i-1}))^2 + (C_2(t_{i-1}))^2}}$$

There is therefore provided a method and apparatus that provides improvements in the visual feedback provided to a user of a rotary shaver to enable the user to improve their shaving performance.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for providing visual feedback to a user of a rotary shaver, the method comprising:
   (i) receiving movement measurements representing movement of the rotary shaver during a shaving operation;
   (ii) processing the received movement measurements to determine a representation of a trajectory of movement of the rotary shaver during the shaving operation;
   (iii) processing the determined representation to project the representation of the trajectory of movement onto a two-dimensional plane;
   (iv) generating a graphical user interface, (GUI), the GUI including the projected representation and a graphical template comprising an annular target zone for a correct circular motion of the rotary shaver during the shaving operation; and
   (v) displaying the generated GUI using a display unit.

2. The method as claimed in claim 1, further comprising repeating steps (ii)-(iv) for further received movement measurements to generate an updated GUI, and displaying the generated updated GUI using the display unit.

3. The method as claimed in claim 1, further comprising:
   comparing the projected representation to one or more boundaries represented by the annular target zone,
   wherein the GUI further includes a visual element based on a result of the comparison.

4. The method as claimed in claim 1, wherein generating the GUI comprises:
   determining an alignment of the projected representation with the graphical template; and
   generating the GUI with the projected representation overlaid on the graphical template according to the determined alignment.

5. The method as claimed in claim 1, wherein processing the received movement measurements to determine the representation of the trajectory of movement comprises filtering to remove high frequency components in the movement measurements.

6. The method as claimed in claim 1, wherein processing the determined representation to project the representation of the trajectory of movement onto the two-dimensional plane comprises:
   for a plurality of movement measurement samples in the received movement measurements, computing an orientation of an instant tangent plane based on a previous plurality of measurement samples;
   projecting the movement measurement samples on to the instant tangent plane;
   aligning the projected movement measurement samples with previously-projected movement measurement samples; and
   applying de-trending to the aligned projected movement measurement samples.

7. The method as claimed in claim 1, further comprising:
   processing the projected representation to determine one or more values for one or more characteristics of the movement of the rotary shaver,
   wherein the GUI further includes the determined value or determined values.

8. A non-transitory computer readable medium storing computer readable code that, on execution by a suitable computer or processor of a rotary shaver, causes the computer or processor;
   receive movement measurements representing movement of the rotary shaver during a shaving operation;
   determine a representation of a trajectory of movement of the rotary shaver during the shaving operation based on the received movement measurements;
   project the determined representation of the trajectory of movement onto a two-dimensional plane;
   generate a graphical user interface (GUI), wherein the GUI includes the projected representation and a graphical template comprising an annular target zone for a correct circular motion of the rotary shaver during the shaving operation; and
   display the generated GUI.

9. The computer readable medium as claimed in claim 8, wherein the computer readable code further causes the computer or processor to:
   compare the projected representation to one or more boundaries represented by the annular target zone; and
   generate the GUI to further include a visual element based on a result of the comparison.

10. The computer readable medium as claimed in claim 8, wherein the computer readable code further causes the computer or processor to generate the GUI by:
    determining an alignment of the projected representation with the graphical template; and
    generating the GUI with the projected representation overlaid on the graphical template according to the determined alignment.

11. The computer readable medium as claimed in claim 8, wherein the computer readable code further causes the computer or processor to process the received movement measurements to determine the representation of the trajectory of movement by filtering to remove high frequency components in the movement measurements.

12. The computer readable medium as claimed in claim 8, wherein the computer readable code further causes the computer or processor to process the determined representation to project the representation onto the two-dimensional plane by:
    for a plurality of movement measurement samples in the received movement measurements, computing an orientation of an instant tangent plane based on a previous plurality of measurement samples;
    projecting the movement measurement samples on to the instant tangent plane;
    aligning the projected movement measurement samples with previously-projected movement measurement samples; and
    applying de-trending to the aligned projected movement measurement samples.

13. The computer readable medium as claimed in claim 8, wherein the computer readable code further causes the computer or processor to:
    process the projected representation to determine one or more values for one or more characteristics of the movement of the rotary shaver; and generate the GUI to further include the determined one or more values.

14. An apparatus for providing visual feedback to a user of a rotary shaver, the apparatus comprising:
a display unit;
a processing unit in communication with the display unit; and
a non-transitory memory unit storing instructions that, when executed by the processing unit, cause the processing unit to:
receive movement measurements representing movement of the rotary shaver during a shaving operation;
process the received movement measurements to determine a representation of a trajectory of movement of the rotary shaver during the shaving operation;
process the determined representation of the trajectory of movement to project the representation onto a two-dimensional plane;
generate a graphical user interface, (GUI), the GUI including the projected representation and a graphical template comprising an annular target zone for a correct circular motion of the rotary shaver during the shaving operation; and
display the generated GUI on the display unit.

15. The apparatus as claimed in claim 14, wherein the instructions further cause the processing unit to:
compare the projected representation to one or more boundaries represented by the annular target zone; and
generate the GUI to further include a visual element based on a result of the comparison.

16. The apparatus as claimed in claim 14, wherein the instructions further cause the processing unit to generate the GUI by:
determining an alignment of the projected representation with the graphical template; and
generating the GUI with the projected representation overlaid on the graphical template according to the determined alignment.

17. The apparatus as claimed in claim 14, wherein the instructions further cause the processing unit to process the received movement measurements to determine the representation of the trajectory of movement by filtering to remove high frequency components in the movement measurements.

18. The apparatus as claimed in claim 14, wherein the instructions further cause the processing unit to process the determined representation to project the representation onto the two-dimensional plane by:
for a plurality of movement measurement samples in the received movement measurements, computing an orientation of an instant tangent plane based on a previous plurality of measurement samples;
projecting the movement measurement samples on to the instant tangent plane;
aligning the projected movement measurement samples with previously-projected movement measurement samples; and
applying de-trending to the aligned projected movement measurement samples.

19. The apparatus as claimed in claim 14, wherein the instructions further cause the processing unit to:
process the projected representation to determine one or more values for one or more characteristics of the movement of the rotary shaver; and
generate the GUI to further include the determined one or more values.

20. A system, comprising:
a rotary shaver; and
the apparatus for providing visual feedback to the user of the rotary shaver as claimed in claim 14.

* * * * *